United States Patent [19]
Camm

[11] 3,851,565
[45] Dec. 3, 1974

[54] SERVO-BOOSTERS FOR VEHICLE BRAKE SYSTEMS

[75] Inventor: John James Camm, East Malvern, Australia

[73] Assignee: Girling Limited, Birmingham, England

[22] Filed: Aug. 14, 1972

[21] Appl. No.: 280,167

[30] Foreign Application Priority Data
Aug. 13, 1971  Great Britain.................... 38063/71

[52] U.S. Cl. ................. 91/369 B, 91/375 R, 92/99
[51] Int. Cl. ............................................. F15b 9/10
[58] Field of Search .......... 91/369 B, 369 A, 369 R, 91/375 R

[56] References Cited
UNITED STATES PATENTS
3,389,642  6/1968  Robinette.......................... 91/369 B
3,756,124  9/1973  Camm............................... 91/369 B Primary Examiner—Paul E. Maslousky
Attorney, Agent, or Firm—Scrivener Parker Scrivener & Clarke

[57] ABSTRACT

The invention concerns differential pressure operated servo boosters of the type in which a load-actuating member is displaceable by the application of differential fluid pressures under the control of the valve, to a movable wall in the form of an annular elastic diaphragm. The booster includes a radially slotted annular deflecting plate defined by a plurality of rigid, individual, radially extending fingers. The diaphragm has a first portion which extends generally radially outwardly of the booster axis and a second axially extending portion which is located radially outwardly of the deflecting plate and hwich is supported by an axially extending portion of the annular skirt member. In order to provide a support therefor, the radially outer ends of at least some of the fingers forming the deflecting plate are located in a radially inwardly projecting portion of the annular skirt member.

2 Claims, 3 Drawing Figures

SERVO-BOOSTERS FOR VEHICLE BRAKE SYSTEMS

This invention concerns differential pressure operated boosters, especially for vehicle braking systems, of the kind in which a load-actuating member is displaceable by the application of differential fluid pressures to a movable wall.

Systems employing such boosters are known which function under the control of a valve which is arranged to alter the pressure on one side of the movable wall relative to that on the other side, and it is recognised that it is desirable to provide on the operating member of the valve, a reaction which the operator can sense and which is proportional to the degree of pressure differential established between the two sides of the wall. In a vehicle braking system, the operator then experiences the "feel" of the brakes, which assists him to control the extent to which they are applied.

One convenient way of providing the required reaction or feel is to arrange for the movable wall to be deformed conically or to dish responsive to the pressure differential when the booster is energised and to transmit the reaction resulting from this deformation back to the operator. For this purpose, it has already been proposed to construct the movable wall as an annular elastic diaphragm which is supported by a so-called deflecting plate formed with radial slots to enable it to dish or cone, or to deflect, responsive to differential pressures on its two sides.

It is already known from our prior British Pat. No. 1,144,566 for the deflecting plate for a differential pressure operated booster to comprise a plurality of rigid, individual radial fingers carried by support means which simultaneously maintains said fingers in regularly circularly spaced and radially fixed locations, thereby to define a radially slotted annular plate.

In such boosters, the annular elastic diaphragm has a major portion which extends generally radially outwardly of the booster axis, but also has an axially extending portion located radially outwardly of the deflecting plate and in the region of the peripheral wall of the booster housing. The axially extending portion of the diaphragm is supported by an axially extending portion of an annular skirt member which also has a radially inwardly extending portion engageable by the radially outer end of one side of the deflecting plate which faces said valve.

In order to support the fingers in position so as to form the deflecting plate, it is known to hold the fingers in regularly circularly spaced relationship in pockets formed between two sheets of a plastics material placed one upon the other. However, this arrangement is not always convenient and it is therefore an object of the present invention to provide a support for the fingers which is more universally convenient and which at the same time obviates the necessity for the provision of the plastics material formed with pockets.

According to the present invention, the radially outer ends of at least some of the fingers forming the deflecting plate are located in a radially inwardly projecting portion of the annular skirt member.

In a preferred embodiment of the present invention, the radially inwardly projecting portion of the annular skirt member includes a plurality of arcuate strips attached to the body of said skirt member by radially extending arm portions, said strips being located and dimensioned so as to restrict the axial movement of the radially outer ends of the shorter fingers relative to the radially outer ends of the longer fingers, in a direction away from said valve.

The invention will be described further, by way of example, with reference to the accompanying drawings, in which.

Figure 1:
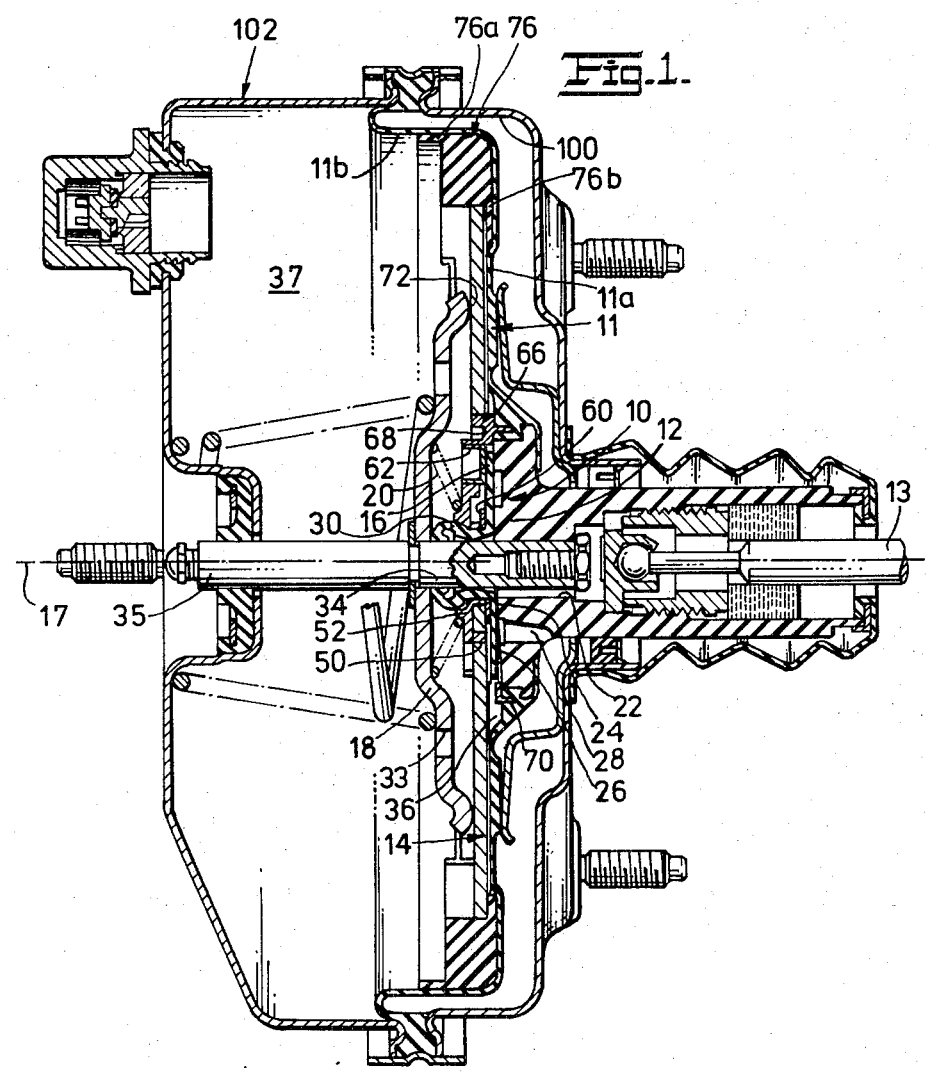
FIG. 1 is a longitudinal section through a servo booster embodying the present invention.

Referring particularly to FIG. 1 of the accompanying drawings, the essential parts of the servo booster necessary for an understanding of the present invention are a flow control valve 10, a diaphragm 11, a valve seat member 12, a circular deflecting plate 14 and a deformable annular valve closure member 16, the deflecting plate being deformable under the action of a spring-loaded dished plate 18 an additional spring 20 to cause corresponding deformation of the valve closure member 16. The longitudinal axis of the flow control valve 10 is denoted by the line 17.

The valve seat member 12, which has an axial bore 22, is provided at its end adjacent the closure member 16 with a pair of radially spaced, annular valve seats 24 and 26 upstanding from its left hand free end face, as viewed in FIG. 1. The annular space between the valve seats 24, 26 is connected by means of four circumferentially spaced transfer ports 28 to the rear of the valve seat member 12, i.e., to the right hand side thereof as viewed in FIG. 1.

The member 16 serves as a common valve closure member for both valve seats 24, 26 and is in the form of an annular elastic disc having an axially directed sleeve portion 30. The valve closure member 16 is engageable with both the valve seats 24 and 26, its sleeve sealingly engaging the shank 34 of an axially directed output rod 35 of the servo booster.

The arrangement is normally such that the radially inner passage formed by the bore 22 of the valve seat member 12 is permanently connected to atmospheric air. In operation and in an operated state of the booster, the deflecting plate 14 is arranged to be distorted to tilt the closure member 16 about the whole circumference of the radially inner valve seat 24. The tilting of the closure member 16 about the inner valve seat 24 conically deforms the member 16 causing it to lift from the outer valve seat 26, so enabling the passages 28 to communicate with a chamber 36 connected by way of apertures 33 in the dished plate 18 to an evacuated part 37 of the servo booster. In this condition vacuum is applied to both sides of the diaphragm 11 of the servo booster which is then in its "vacuum suspended" state.

When the brake pedal is depressed to operate the brakes, the valve seat member 12 is moved to the left as viewed in FIG. 1 by an input rod 13, the first result of this movement being to remove the previous deflection of the plate 14 and to allow the valve closure member 16 to close against both seats 24 and 26. The two sides of the diaphragm 11 are then isolated from one another. Further depression of the brake pedal with consequent further movement of the valve seat member 12 to the left causes the plate 14 to conically distort in the opposite direction, closing the member 16 against the outer valve seat 26 and moving it off the inner seat 24. This causes the passages 28 to be connected to the central bore 22 and hence to the atmosphere so establishing a pressure differential across the diaphragm 11 which moves the diaphragm to the left, together with the deflecting plate 14 and the dished plate 18, and thereby imparting to the output rod 35 an output force which combines with the input applied to the input rod to constitute an operating force for the master cylinder piston (not shown).

Figure 2:
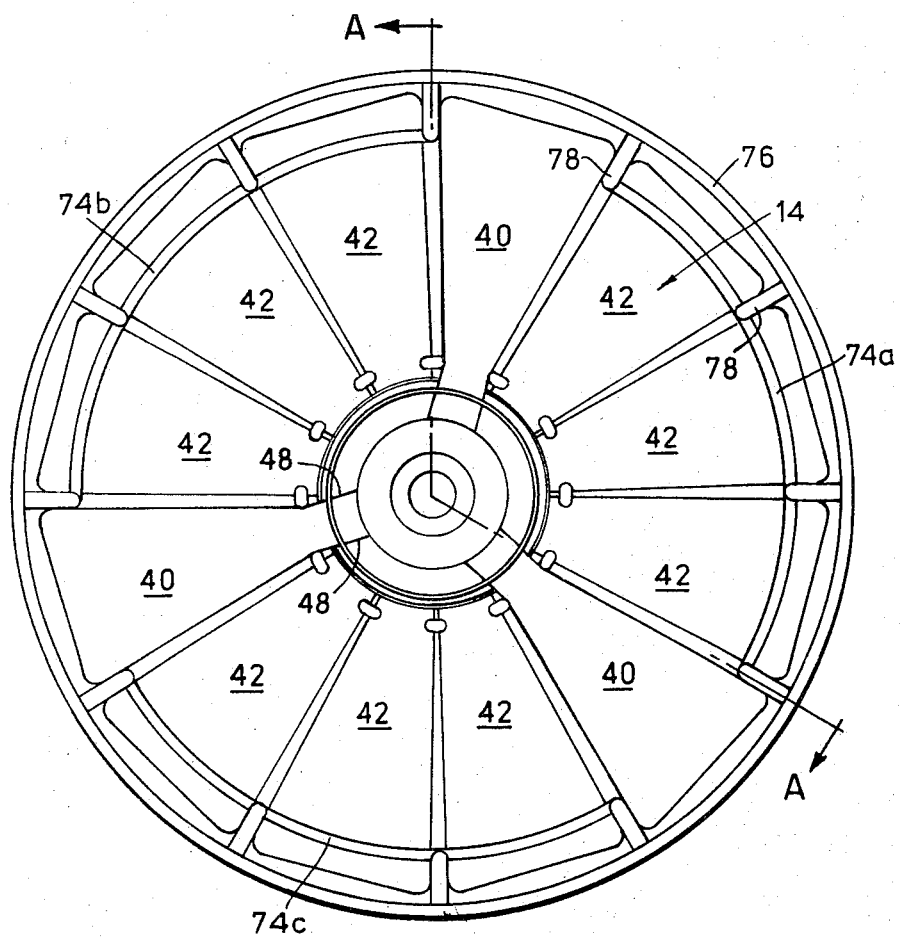
FIG. 2 is a front elevation of a portion of the booster of FIG. 1, to a larger scale, and illustrates in greater detail the method of location of the fingers forming the deflecting plate.
Figure 3:
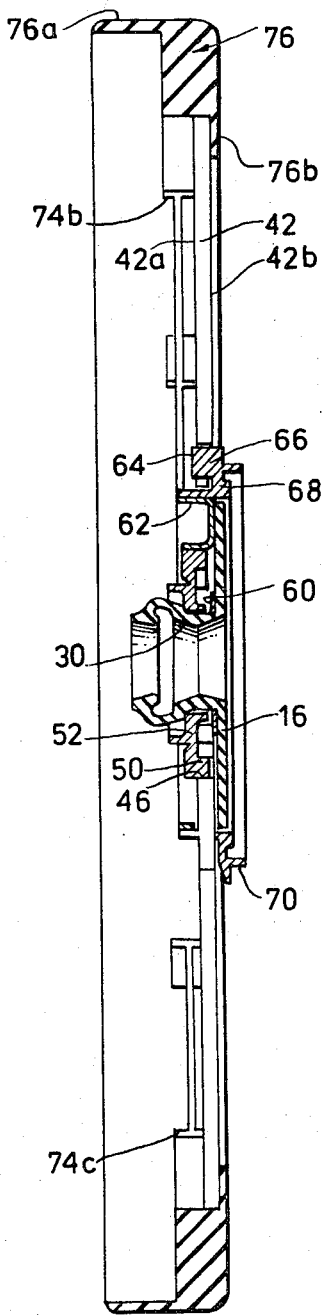
FIG. 3 is a section on the line A—A of FIG. 2.

As will be more clearly seen from FIG. 2, the deflecting plate 14 is made up of a number of radially outwardly divergent deflecting fingers, three 40 of which are relatively long and extend inwardly close to the shank 34 of the output rod 35 and the remainder 42 of which are relatively short. The longer fingers 40 are provided with part circular recesses 46 (see FIG. 3) in a parallel sided portion 48 at their narrower end which recesses 46 are engaged by axially extending studs 50 carried by an annular spring-retaining member 52 which embraces the sleeve portion 30 of the annular elastic disc 16 and which is intended to transmit to the disc 16 the biassing force of the spring 20 (FIG. 1), which force is acting in a direction to close the annular disc 16 against the radially inner valve seat 26. In fact, the transfer of the biassing force of the spring 20 is completed via the inner ends of the longer fingers 40 and an annular plate 60.

Located radially outwardly of the spring retaining member 52 is an annular member 62 of channel cross-section having circumferentially spaced slots therein through which the longer fingers 40 extend. The purpose of the member 62 is to evenly distribute reaction forces from the longer fingers 40 around the periphery of the valve closure member 16.

The shorter fingers 42 are provided with part circular recesses 64 at their radially inner ends which are engaged by axially extending studs or pimples 66 carried by an annular member 68, referred to as the reaction ring. The reaction ring 68 has an annular flange 70 which is embedded in a portion of the diaphragm 11 which is rigidly attached to the valve body 12. By virtue of this construction, reaction forces produced by the shorter fingers 42 pivoting about their point of contact 72 with the dished plate 18 are transferred back to the input rod 13 via the reaction ring 68, the diaphragm 11 and the valve body 12.

The reaction ring 68 is further provided with three circumferentially spaced slots through which the three longer fingers 40 extend.

The radially outer ends of the longer fingers 40 ar located and retained in position by means of the dished plate 18 which engages these fingers at the fulcrum point 72 (see FIG. 1).

A major portion 11a of the annular elastic diaphragm 11 extends generally radially outwardly of the booster axis 17. However, the diaphragm 11 also includes an axially extending portion 11b located radially outwardly of the deflecting plate 14 and in the region of the peripheral wall 100 of the booster housing 102. The axially extending portion 11b of the diaphragm is supported by an axially extending, cylindrical portion 76a of an annular skirt member 76.

The radially outer ends of the shorter fingers 42 are located and retained in position between a radially inwardly extending limb 76b of the skirt member 76 and three arcuate strips 74a, 74b, 74c associated with the three groups of shorter fingers 42 respectively and all connected to the cylindrical portion 76a of the skirt 76 by radially extending arms 78. By virtue of this arrangement, axial movement of the outer ends of the shorter fingers 42 is restricted by the arcuate strips 74 whereby to ensure that the majority of the work is done by the longer fingers 40 whose outer ends are unaffected by the arcuate strips 74 and which are therefore capable of a greater range of axial movement than the shorter fingers 42. In the embodiment described, the arucate strips 74 and the radially extending arms 78 are formed integrally with the annular skirt member 76.

Although in the embodiment described above there are both long and short fingers forming the deflecting plate, in other embodiments the deflecting plate may be formed of a plurality of equal sized fingers as, for example, in our previously referred to British Specification No. 1,144,566. In this event, the arcuate strips would be replaced by a single band extending through 360° and locating all of the fingers.

I claim:

1. A differential-pressure operated servo booster of the type having a load actuating member which is displaceable by the application of differential fluid pressure across an annular elastic diaphragm, comprising a housing, a diaphragm dividing the housing into two chambers, valve means located coaxially of the booster axis for controlling the relative pressure in said two chambers, a plurality of rigid, individual, radially extending fingers which define a radially slotted annular deflecting plate, an annular skirt member located coaxially within the housing and having an axially extending portion and a radially inwardly projecting portion, the diaphragm having a first portion which extends generally radially outwardly of the booster axis and a second, axially extending portion which is located radially outwardly of the deflecting plate and which is supported by said axially extending portion of the annular skirt member and the radially inwardly extending portion of the annular skirt member including a first radially inwardly extending limb which is engaged by that side of each of the fingers which faces towards said valve and at least one second radially inwardly extending limb which engages the other side of at least some of the fingers and wherein said second limb is axially spaced from said first limb and extends radially inwardly from the axially extending portion of said skirt.

2. A servo booster according to claim 1 of the type wherein some of the fingers are longer than others, the longer fingers extending radially further inwards than the shorter fingers, in which each said second limb comprises an arcuate strip attached to the body of the annular skirt member by radially extending arm portions, said arcuate strips being located and dimensioned so as to restrict axial movement of the radially outer ends of the longer fingers, in a direction away from said valve means.

* * * * *